Jan. 2, 1940.  L. M. SHELDON ET AL  2,185,776

METHOD OF TREATING WOOD CELLULOSE

Filed May 26, 1936

DIAGRAMMATIC RELATION OF ACCUMULATOR TANK AND DIGESTER SHOWING GAS AND LIQUOR FLOW.

RELATION OF BLEACHING TEMPERATURE TO VISCOSITY REDUCTION OF CELLULOSE

INVENTORS
LYLE MELVIN SHELDON
LIONEL ELMER GOFF
MILTON L. HERZOG
FREDRICH OLSEN
BY
ATTORNEYS

Patented Jan. 2, 1940

2,185,776

UNITED STATES PATENT OFFICE 2,185,776

METHOD OF TREATING WOOD CELLULOSE

Lyle Melvin Sheldon, Lionel Elmer Goff, Milton L. Herzog, and Fredrich Olsen, East Alton, Ill., assignors to The Cellulose Research Corporation, East Alton, Ill., a corporation of Delaware Application May 26, 1936, Serial No. 81,844

9 Claims. (Cl. 8—105)

This invention relates to cellulose, and with regard to certain more specific features, to wood cellulose and its derivatives, and the manufacture thereof.

Among the several objects of the invention may be noted the provision of a novel wood cellulose product which may be used as a base material for conversion into derivatives, such as cellulose acetate, for example, to supplant the purified cotton linters heretofore used, and the provision of cellulose of the class described in such a form that it may be converted into derivatives by the methods, apparatus, and technique currently employed throughout this industry without substantial changes therein.

A further object of the invention is the provision of a method of manufacturing wood cellulose of the class described, the method being such that of the order of 80% or more of the original or native alpha cellulose content of the wood from which the cellulose is manufactured, is retained.

Still a further object of the invention is the provision of methods and products as heretofore described, at an economy of cost and labor.

Other objects will be in part obvious and in part pointed out hereinafter.

Figure 1:
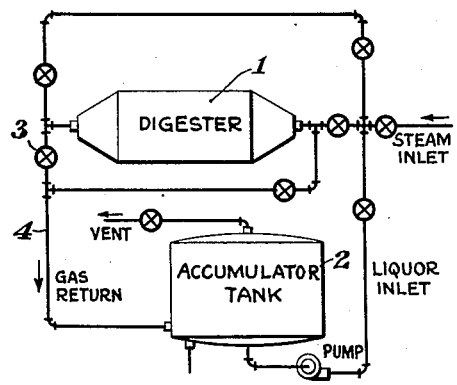
Figure 2:
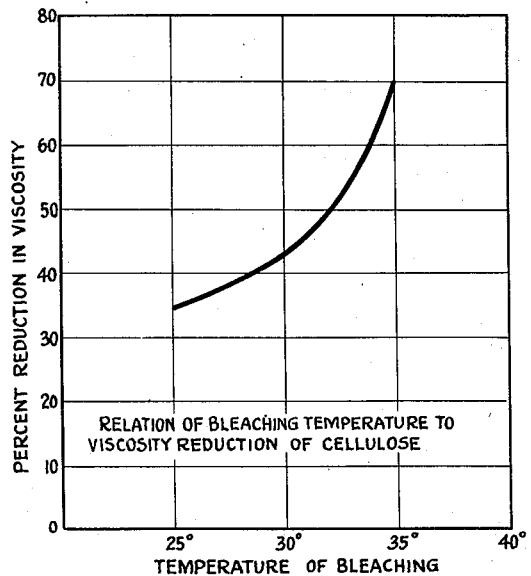

In the accompanying drawing, which illustrates certain features of the present invention, Figure 1 is a diagram showing an accumulator tank and a digester, and certain connections therebetween; and Figure 2 is a graph showing the relations between temperature and cuprammonium viscosity of pulps, treated for a predetermined time with calcium hypochlorite solution of a predetermined concentration.

The nature of a cellulose product is dependent in a large manner on the process by which such product has been produced from its raw material. For example, it is important in the processes by which wood is purified into wood cellulose, that the purification treatments be such as will not in themselves and any appreciable quantities of soda soluble material and/or hydrated or other degradation products at the expense of the unfavorable depolymerization or other degradation of the alpha cellulose component of the wood. Such products of degradation, we have found, tend to form irreversible gels which block or seal the network of capillary channels in the fiber structure resulting from the removal of the matrix material originally existing in the wood. The prior art digestion and purification methods for providing wood cellulose of an alpha cellulose content greater than 90% generally include such drastic treatments as to result inevitably in a severe degradation of the cellulose in the foregoing particulars.

We have, through long and involved research, determined that there are certain definite requirements that must be met before a wood cellulose is capable of satisfactory acetylation, or esterification, or conversion into other derivatives. These requirements include at least four apparently interdependent properties, namely, (1) purity, (2) permeability, (3) a favorable chemical condition of the cellulose fibers to permit adequate reactivity with the acetylating reagent, and (4) a favorable physico-chemical condition of the cellulose fibers, which is possibly related to the state or extent of polymerization of the cellulose molecules in the fibers. The proper attainment of conditions represented by these four requirements apparently provides the key to the production of a wood cellulose capable of being readily, uniformly, and economically converted into the highest qualities of cellulose acetate or other derivatives.

Because the meaning of certain terms frequently employed in the cellulose art is somewhat obscure, depending upon the individual interpretation of analytical evaluative methods, it is considered advisable, before proceeding further with the description of the present invention, to define certain of the terms used herein:

"Permeability", as used herein, is defined as the absorptive power of a substance, particularly the fibers with which the present invention is concerned. By fibers of high permeability, as used in this specification, is meant a swollen skeletal fiber structure comprising a network of capillary channels substantially cleared of amorphous and other non-cellulosic material. The network of capillary channels of such swollen fibers serve to distribute liquid throughout the cell walls of every fiber. Such liquids provide a diffusion medium by means of which the desired reagents are able promptly to reach every part of the fiber. These liquids may be the actual treating solutions themselves. In addition to the network of channels mentioned above, the cell wall substance should be in a substantially completely swollen condition in order to assist, by diffusion through the swollen cell walls, the work of the capillaries in the distribution of liquid uniformly throughout the fibers. Fibers are considered to be less permeable when the amorphous and other non-cellulosic material has been insufficiently removed to provide a network of substantially unobstructed capillary passages, or the fiber structure is insufficiently swollen, or both. Permeable fibers will absorb more liquid than impermeable fibers.

"Cuprammonium viscosity", as used herein, means the viscosity number or value obtained according to the following method: The cuprammonium solution was prepared by the action of air on electrolytic copper in the presence of strong ammonia water. The copper concentration of the solutions employed for viscosity determinations was 30, ±2 g. per liter and the ammonia content was 165 g. ±2 g. per liter. The concentration of cellulose employed was 0.6 g. (oven dry basis) per 100 cc. of cuprammonium solution. The cellulose sample for this determination was dried at 70° C. to 4% moisture content. After weighing out 0.6 g. (oven dry basis), the sample was moistened, squeezed to a uniform weight of 2 g. and then dispersed in cuprammonium solution in an atmosphere of hydrogen from which oxygen has been completely removed. The viscosity measurements were made at 25° C. with a modified Ostwald pipet, constructed according to the specifications of the American Chemical Society Committee on the Viscosity of Cellulose (Journal of Industrial & Engineering Chemistry, I, 49; 1929). The time of flow in seconds was converted to centipoises on the basis of the calibration of the pipet with oils of known viscosity in centipoises obtained from the United States Bureau of Standards. "Centipoises" is frequently abbreviated herein to ctps.

"Alpha cellulose", as used herein, is defined as that portion of a sample of cellulosic material not dissolved by 17.5% sodium hydroxide solution at 20° C., determined by the following method:

A 1.0–1.2 gm. of cellulose representative of the lot to be tested is weighed in a closed weighing bottle on an analytical balance. The moisture content of the air dry material, from which the sample is taken, is accurately determined for the purpose of calculating the oven dry weight of sample used. The sample is transferred to a 250 cc. beaker. 10 cc. of 17.5%±0.1 carbonate free NaOH solution is added to the sample in the beaker. The beaker is set in a water bath kept at 20° C. After the caustic has been on the sample two minutes, the sample is macerated with the glass rod. At each five-minute interval after the caustic is first added, 5 cc. portions of the caustic solution are added until the total amount is 25 cc. The sample is macerated after each addition of caustic. After the addition of the last 5 cc. portion, the sample is allowed to stand in the 20° C. bath for 30 minutes and at the end of the thirty-minute period, the sample is diluted with 42 cc. of distilled water at 20° C., with thorough stirring. At the end of 5 minutes after dilution, the slurry is quantitatively transferred to a tared "Jena" glass crucible, with a fritted glass bottom and the solution filtered off.

250 cc. of distilled water at 20° C. are placed in a wash bottle. Small portions of this are used to wash any residue in the beaker into the crucible. This is accomplished by not only running water through the pulp mat, but also by breaking the vacuum on the crucible and agitating the pulp in 20–25 cc. of the water with the glass stirring rod. The vacuum is again applied and the solution drawn off the pulp. This is repeated three or four times, pressing the pulp mat down after each agitation. The last of the 250 cc. of water is used to wash any residue off the stirring rod into the crucible and to wash any fibres adhering to the sides of the crucible down into the pulp mat.

15 cc. of 10% acetic acid solution is then drawn down into the pulp and after breaking the vacuum is allowed to stand three minutes. The sample is then washed with distilled water at 20° C. until the filtrate is neutral to litmus. 250 cc. of excess $H_2O$ at 20° C. is then drawn through the sample. The crucible containing the sample is placed in a tared weighing bottle in the oven at 105° C. and left in the oven for three hours. At the end of the three hour period, the weighing bottle is covered, desiccated in an $H_2SO_4$ desiccator to room temperature, and weighed accurately on an analytical balance. The bottle is then returned to the oven, uncovered, and the sample again further dried. The sample is desiccated and weighed at hour intervals until constant, or an increase in weight is obtained.

The percent alpha cellulose content of the sample is calculated according to the following equation, % alpha cellulose = oven dry weight of cellulose residue times 100 divided by oven dry weight of sample.

"Soda soluble material", as used herein, is defined as that portion of a cellulosic sample dissolved when it is subjected to the action of 7.14% NaOH solution at the boiling point of water for three hours by the following procedure:

Approximately 2.2 grams of the air dry cellulose is accurately weighed in a tared weighing bottle on an analytical balance. The sample is then quantitatively removed from the weighing bottle and placed in a 250 cc. Erlemeyer flask.

100 cc. of 7.14%±.05 NaOH solution, free of $Na_2CO_3$ (the sodium hydroxide solution is prepared by dissolving solid alkali in an equal weight of water, and allowing to stand until the suspended material has settled out, leaving the supernatant liquor clear. The liquor is then decanted off the material which settled out, and is used to make up the 7.14% NaOH solution), is added to the sample in the flask. The flask is fitted with an air condenser (a glass tube, 6 mm. inside diameter by 60 cm. long) by means of a rubber stopper. The flask is then put into a vigorously boiling water bath, so that the water level of the bath is about one inch above the level of liquid inside the flask. This water level is maintained throughout the test by adding boiling water to the bath as needed. The water of the bath should be kept boiling throughout the test.

At the end of exactly three hours after the flask is placed in the bath, the sample is quantitatively poured into 300 cc. of distilled water containing a few drops of alcoholic phenolphthalein in a two or three liter beaker. Concentrated acetic acid is added rapidly, with stirring, until the indicator just changes color. 5 cc. excess concentrated acetic acid is then added. The acidified solution is filtered on a tared "Jena" glass crucible, with fritted glass bottom.

The residue is washed with distilled water at 50° C. until the filtrate is neutral to litmus. This is accomplished by breaking the vacuum and carefully stirring the sample with a glass stirring rod in the crucible in 20–25 cc. of the 50° C. distilled water. After the last agitation, any fibers adhering to the glass stirring rod or walls of the crucible are carefully washed down into the pulp mat. This is repeated as often as necessary to wash the acid from the sample.

The crucible is then placed in a tared weighing bottle and the material is dried to constant weight as described in the alpha cellulose procedure above. The loss of weight of the sample is determined by subtracting the final dry weight of the cellulose from the original dry weight of the cellulose. The percent soda soluble is calculated by multiplying the loss in weight by 100 and dividing by the weight of oven dry sample.

"Bleachability of cellulose", as used herein, is a measure of the materials oxidizable by potassium permanganate in the presence of an acid, and is expressed in terms of standard bleaching powder containing 35% available chlorine. The determination consists of treating a 1-gram sample of material completely dispersed in 750 cc. of a solution composed of 0.133 N sulfuric acid and N/300 potassium permanganate for 5 minutes at 25° C.; reacting the unconsumed potassium permanganate with potassium iodide, and back titrating with sodium thiosulfate. A detailed description of the method, including the conversion table for expressing the permanganate number in terms of per cent bleaching powder of 35% available chlorine, was published by T. A. P. P. I., Series XVII, #1, 146 (1934), "Permanganate Number of Pulp" by R. N. Wiles.

The first step of the process of the present invention comprises subjecting a wood, in a suitable state of subdivision, to a digestion procedure. As raw materials, the present invention is capable of utilizing any species of wood which can be properly pulped and digested. For example, coniferous wood such as spruce, hemlock, fir, and pine, as well as deciduous wood such as gum, maple, birch, and poplar, can all be used.

For acid digestion either calcium, sodium, or ammonium bisulfite base liquors may be used, but in any case the digestion conditions are preferably adjusted to yield a raw pulp which has a viscosity of not less than the order of 30 ctps., and preferably higher, usually giving a bleachability between the order of 15% and 35%, and a soda soluble content of less than the order of 30% for pulp from deciduous woods and less than the order of 25% for pulp from coniferous wood.

The second step of the process of the present invention comprises purifying the pulp by a series of chemical treatments including a treatment with chlorine, a hypochlorite bleaching, an alkaline boil, a second hypochlorite bleaching if necessary, and finally a mercerization, with thorough washing between all treatments to remove reaction products. The concentration and temperature of chlorination and the amount of chlorine employed are controlled so that a minimum depolymerization of cellulose occurs while a maximum of ligneous material is made soluble. The variables of concentration, temperature, pH, and time, are controlled during bleaching so that a maximum of oxidizable impurities are removed with a minimum degradation of the cellulose. The variables of concentration, time, and temperature of the alkaline boil are also so controlled that minimum depolymerization of the cellulose occurs and a maximum amount of soda soluble material is removed. Likewise, the mercerization conditions are adjusted to affect a minimum of cellulose depolymerization and to yield a maximum amount of cellulose having a highly porous structure and an alpha cellulose content greater than the order of 98.5%.

The accumulative effect of these carefully controlled purification treatments following the similarly controlled digestion of the wood is to retain a maximum amount of the native cellulose of the raw material wood, which native cellulose has been subjected to a minimum of modification. An important feature of the present invention is the retention, in the purified cellulose, of more than the order of 80% of the native alpha cellulose of the original raw material wood.

The purification treatments are controlled throughout to promote a progressive increase in alpha cellulose content with a concomitant progressive decrease to a minimum of soda soluble material. At the same time, undesirable depolymerization of the cellulose is avoided, and the depolymerization is so controlled as to attain an end product with a cuprammonium viscosity of not less than the order of 15 ctps., or such higher values as may be desired.

A cellulose prepared in accordance with the foregoing process may be dried by the usual well-known evaporative method and thereafter economically converted into derivatives, such as, for example, cellulose acetate, without the customary degrading pretreatment, in a greatly reduced period of time, with the use of not more than the order of 2.2 parts of acetic anhydride to 1.0 part of cellulose (oven-dry basis). In its dried form, the cellulose of the present invention may be converted into derivatives, particularly cellulose acetate, by the method, apparatus, and technique generally employed in the industry wherein cotton linters is used as a basic raw material. By providing cellulose material, according to the present invention, in a state of proper purity and in a sufficiently high state of polymerization, such cellulose is able even to survive the relatively drastic pretreatment usually given to the cotton linters base material, and upon acetylation yield a satisfactory, and in some cases a superior cellulose acetate product.

To recapitulate, the process of the present invention, insofar as it relates to the preparation of a wood cellulose product, may be described as a process involving the preparation of wood pulp by a lenient uniform treatment, and the treatment of said wood pulp in a series of mild steps, to obtain as a product a cellulose having an alpha cellulose content greater than the order of 98.5%, a soda soluble content of less than the order of 2.5%, and a cuprammonium viscosity greater than the order of 15 ctps., in which more than the order of 80% of the original alpha cellulose content of the raw material wood is retained, and with such chemical and physicochemical characteristics that its reactivity towards acetylating reagent permits it to be dried and acetylated by known methods and even by simplifications of such known methods.

In order more particularly to describe the present invention, there follows the description of a typical embodiment of the invention. It will be understood that the various features set forth in connection with the embodiment are by way of illustration only, and may be considerably varied within the scope of the present invention.

*Example A*

For the following example, spruce wood is chosen as the raw material wood, and ammonium bisulphite liquor is used as the digestion liquor. It will be understood, however, that the scope of the invention is not so limited.

The natural moisture content of the spruce wood is preferably maintained as well as possible by using freshly cut wood and maintaining the protecting bark on the logs until ready for chipping or other subdividing.

The bark is removed from the wood and the logs are thoroughly washed free of bark and dirt and cut into chips, preferably about ¼ inch long. It may be cut into flakes if desired, about one inch long and approximately .020–.30 inches in thickness. Water may be sprayed on the logs during the flaking and chipping operations in order to protect the wood from the drying action of the air (or accelerated evaporation by frictional heat). The wood will thus retain the greater part of its natural moisture, which in most cases is in excess of 50%. The flakes or chips are stored in air-tight containers until ready for charging into the digester, so as to retain their natural moisture content. Wood containing 45% moisture when charged into the digester gives satisfactory results.

The wood in the subdivided form is charged into a digester, as indicated by numeral 1 in Figure 1. The digester is preferably of the rotary type and constructed of or lined with a corrosion-resistant material such as the chrome-nickel-steel alloy known as "20–10" and is equipped with means for injecting both steam and acid while either stationary or rotating. The well known types of stationary digesters may also be employed but in such cases it is important that particularly efficient heating and circulating facilities be provided and that such facilities be constructed of the aforementioned chrome-nickel-steel, for example, so that metallic contamination of the treating solutions will be avoided. An example of a satisfactory circulating system of this type for use with stationary digester equipment is the well known "F. M. P." system. (Paper Trade Journal vol. 96, No. 10, pages 39–42, 1933). A rotary type Allegheny metal digester has been used satisfactorily in the process herein described.

The treating liquor may advantageously comprise ammonium bisulfite having an excess of free sulfurous acid, a composition comprising a total $SO_2$ content of 4.45% and a combined $SO_2$ content of 1.1%. The ratio of treating liquor to wood employed is of the order of 6.0 pounds to 1.0 pound of oven dry wood. The liquor is preferably preheated in a separate accumulator tank 2 (Figure 1) or other suitable apparatus to a temperature of approximately 90° C. which results in a pressure of approximately 30 pounds per square inch, provided substantially no air is in the accumulator 2.

Steam is added to the digester 1 prior to the addition of the cooking liquor until the shell and contents have been heated to a temperature of approximately 60° C., during which heating period the digester 1 is rotated continuously. The pressure which develops from this preheating, largely due to the expansion of the heated air, and amounting to approximately 10 pounds per square inch, is released before the acid is added from the accumulator tank 2. The correct volume of cooking liquor (taking into account the moisture content of the wood) preheated to 90° C. is then pumped into the digester, and steam is added until the entire charge is heated to 90° C. at which temperature level it is held for one hour in order to insure penetration of base into wood before temperatures of 100°–105° C. are exceeded. The pressure in the digester 1 at this temperature is approximately 43 pounds per square inch, indicating the presence of a considerable amount of air. At the end of the one hour period at 90° C. the temperature is raised at a uniform rate to 122° C. over a period of two hours.

When the temperature passes through the 103°–106° C. range a series of short periods of relief (usually four of approximately 30 seconds each) is given by means of a valve 3 in the relief line 4 from the digester 1 to the accumulator tank 2, for the express purpose of removing the remaining air still retained in the wood and in the digester 1. At the temperature named, the entire contents of the digester 1 are above the ebullition point of the cooking liquor at atmospheric pressure; hence when the relief line valve 3 is opened there is a rapid and uniform ebullition throughout the mass of chips and treating liquor, which effectively boils out any air remaining within the interstices of the wood. The height of the liquor and chip charge in the digester 1 will influence the temperature level at which the air relief is practiced, since an increased height of liquor and weight of chips, will increase the temperature at which ebullition of the cooking liquor at the bottom of the digester will take place when the relief line is open. During and after the boiling period the chips are desirably maintained continuously submerged, in order to maintain the benefits of the prior exhaustion of the air from the wood.

The pressure at the time of the gas relief is usually about 63 pounds per square inch and during the series of reliefs for the removal of air it will drop 15–20 pounds per square inch. This may be accepted as an indication that substantially all the air has been removed.

If desired an alternate method may be used in order to saturate the wood cavities with liquor. After the air has been removed from the wood and digester as just described by venting the digester at the 103°–106° C. point, saturation may be accomplished by cooling the contents slightly below 100° C. This effects a condensation of the steam within the wood and results in penetration of the liquor. After soaking the wood at less than 100° C. for say 30 minutes, the digestion may be continued as described.

The temperature is maintained preferably closely within the range from 121° to 123° C. for about four hours; the pressure at this temperature level is approximately 65 pounds per square inch. Sulfonation of the non-cellulosic components of the wood is in progress during this four-hour interval at the 121° to 123° C. temperature level, and at the end of this period is substantially complete.

The characteristics of the pulp can be varied over a wide range by gas reliefs made early in the cook, for example, during the period at which the temperature is maintained constant at 121° to 123° C. and also before this temperature level is reached. In order to produce pulp of the greatest possible uniformity a minimum of $SO_2$ is released until substantially complete sulfonation of the non-cellulosic components of the wood is effected, which reaction takes place at a very desirable rate at the 121° to 123° C. temperature level. After the ligneous material is properly sulfonated, however, wide variations in gas relief can be made with substantially little variations in the characteristics of the end product. However, to duplicate pulp characteristics, close adherence to the predetermined temperature schedule during the latter stages of the cook is advisable since the rate of hydrolysis of the sulfonated ligneous components is readily affected by variations in temperature.

At the end of the four-hour period the temperature is raised to 135° C. at a uniform rate over a period of 1½ hours, and maintained preferably closely within the range from 134° to 136° C. for about 2¼ hours. If the permissible pressures which may be employed in the digester are, for example, limited to 75–85 pounds per square inch, gas may be released from the digester while the temperature is being raised to 135° C. to prevent exceeding the allowable pressure limits.

Figure I illustrates the pressure relations between the digester 1 and the acid accumulator tank 2 which exist under the conditions described above. For example, the digester 1 may have a pressure of 63 pounds per square inch and a temperature of 104° C., and is connected with an acid accumulator tank 2 which is at approximately 30 pounds pressure and a temperature of 90° C. Upon opening the relief valve 3 steam, sulfur dioxide vapors, and air from the digester will enter the accumulator tank through line 4. The pressure will increase in the accumulator tank due to the increased temperature and the presence of air, but if a relief valve 5 on the accumulator tank 2 is set to open at 40 pounds, air and $SO_2$ may continuously escape through this open valve 5 and boiling will proceed in the digester 1 because of the differential pressure between the two vessels 1 and 2, and the fact that the temperature within the digester 1 is greater than the boiling point of the cooking liquor.

When the cooking schedule is completed, an economical recovery of a large portion of the sulfur dioxide present in the digester 1 can be effected by releasing the pressure of the digester through the accumulator tank 2 in the same manner as described for the air release.

When the pressure of the digester has been released to substantially the pressure of water vapor at the temperature of the pulp, the treating liquor is drawn out and conveyed to the liquor recovery system. Water preferably at not less than 100° C., and ordinarily as high as 150° C. is injected into the digester until it is approximately two-thirds filled. The unwashed pulp is then mixed with the wash water by rotating the digester for about 5 minutes. The wash liquor is drawn off and the washing operation repeated until all soluble impurities have been removed and the pH of the pulp is between 6.8 and 8.0, between which range it is maintained until the addition of chlorine in the first step of the subsequent purification treatment. Thorough washing is also important to insure the removal as far as possible of those impurities in the pulp which are soluble in hot water, but not soluble in cold water. Air is excluded from the pulp during the draining and washing operations until all sulfur dioxide and hot water soluble impurities have been removed and the pH of the pulp raised to the desired level.

After washing, the pulp is discharged from the digester into a dump tank and subjected to violent agitation to break down any fiber bundles which may exist into separate fibers.

By the foregoing cooking procedure 50 to 52 pounds or more of pulp (oven-dry basis) are obtained from each 100 pounds of spruce (also oven-dry basis) used. A typical analysis of the washed pulp is as follows:

| | | |
|---|---|---|
| Alpha cellulose | per cent | 86.7 |
| Soda solubles | do | 23.6 |
| Ash | do | .6 |
| Cuprammonium viscosity | ctps | 54.4 |
| Bleachability | per cent | 31.2 |

Where chips longer than ¼ inch are used, it is frequently desirable to modify the method of impregnation by first submerging and boiling the chips in water in the digester for about 30 minutes and then displacing the excess water from the bottom of the digester by means of superheated steam added above the liquor level. To keep the amount of water absorbed by the wood at a minimum, the water used for impregnation must be maintained at a vigorous boil during its displacement by the steam. The object is to avoid even a slight drop in the temperature of the water below the boiling point, since the amount of liquid absorbed by the chips would thereby be greatly increased and thus necessitate the use of much more concentrated digesting liquors to compensate for the excess water present. The steam with which the digester is filled condenses very readily, creating a vacuum within the digester and also within the interstices of the wood. The treating solution is then added and saturates the chips. By this procedure chips are freed of all air and impregnated with the cooking acid without first becoming saturated with water. Furthermore, the chips are impregnated not only with $SO_2$ but with the base as well, since the liquor is drawn into the chips presumably in an unaltered form.

Preimpregnation of the wood with water may be omitted if desired, and the chips boiled in ammonium or other sulfite or bisulphite solution containing substantially no free $SO_2$. The desired composition of the treating solution is attained by adding the requisite amount of $SO_2$ directly to the liquor into which the chips are submerged, after the impregnation has been accomplished.

After the washed pulp has been thoroughly defibered and its consistency adjusted to 3%–10%, it is transferred to a gas-tight chlorination tank equipped with high efficiency agitation. For the attainment of the highest efficiency in the use of reagents in purifying raw cellulose pulps, the amount of chlorine and the method of its application to the pulp is important. Maximum removal of lignin and other coloring matter and impurities from the pulp per pound of chlorine consumed is effected by adding just the amount of chlorine to the pulp slurry which will exhaust in 5–15 minutes under temperature conditions controlled between 15° and 30° C. This amount is arrived at by using, in pounds of chlorine per 100 pounds of pulp, 16% of the bleachability value of the raw pulp. For example, the correct weight of chlorine to be used for a pulp having a bleachability of 30% is obtained as follows:

100 pounds of pulp will require 30×16%=4.8 pounds of chlorine.

The amount of chlorine added is preferably held within a tenth of a pound of the figure thus obtained.

Within the customary ranges of bleachability of the raw pump (for example, between 15% and 35%) this factor of 16% (used in computing the number of pounds of chlorine to be added) results in the addition of sufficient chlorine to effect a rapid and complete chlorination of the ligneous material without waste of chlorine and has the further important effect of bringing raw pulps of widely varying properties to an unexpected degree of uniformity after the products of the chlorination have been removed by the subsequent causticizing treatment. Thus the variations in the raw pulp due to the normal fluctuations in the quality of the wood supply occasioned by differences in the age of the trees, moisture content, different proportions of sapwood and heartwood, and locality in which the wood has been grown, variations in pulping control between digester batches, and other factors not generally feasible in practice to control, are leveled out.

The required amount of chlorine gas is incorporated in the pulp slurry at a uniform rate of flow, in between 20 and 30 minutes. The efficiency of the use of reagent is increased by making the addition to the slurry in as short a time as possible. Care must be taken, however, that the addition of the gas is made under conditions which insure its uniform distribution throughout the pulp. The chlorine will be substantially exhausted in an additional 5-15 minutes, but the treatment may be allowed to continue for a total of 45 minutes in order to allow the acids formed by the chlorination treatment to act upon the ash content of the cellulose.

After the chlorination treatment, the cuprammonium viscosity value of the pulp in the successive stages of its purification is a valuable criterion for the control of the uniformity of the product as between successive batches. For example, for a given end product, a definite schedule of viscosities after each succeeding step may be set up, and adhered to throughout successive batches, yielding substantially identical products even with wide variations in raw materials. Relatively slight departures from the scheduled viscosities are apparently reflected in appreciable differences in the final product characteristics, including its viscosity.

Further, proper control of viscosity during a chemical treatment of the cellulose allows the treatment to be terminated before any appreciable degradation occurs. In treatments in which there is a reduction of viscosity, the reduction is usually very rapid at the start. However, after a period of time depending on the conditions of the treatment, the rate of viscosity reduction decreases appreciably and is usually accompanied by a reduction of alpha cellulose content and an increase in soda soluble content of the cellulose. The first rapid drop in cellulose viscosity can usually be accomplished without suffering any substantial degradation and for this reason it is preferred to terminate such treatments before or at the point at which the rate of viscosity reduction becomes relatively small. Such control results in a product of high purity and reactivity.

At the end of the chlorination treatment, a sufficient amount of sodium hydroxide is added to bring the concentration of the alkaline solution to the order of 1% in a treatment consistency of the order of 2% to 12% depending upon the available agitation equipment. It is desirable to keep the concentration of the sodium hydroxide solution being added to the pulp slurry after exhaustion of the chlorine at the order of 7% or less, as stronger solutions coming in contact with the chlorinated pulp stock, even momentarily, after a tendency to "set" the chlorinated compounds and make them more difficult to remove. The pulp slurry is brought to the order of 100° C. in about 20 to 30 minutes and held at about 100° C. for about 30 minutes. It is then promptly transferred to a continuous filter or centrifuge and washed thoroughly with purified water and the pH adjusted, if necessary, by the addition of hydrochloric acid or lime until it falls within the approximate range of 7.4 to 7.8. For close duplication between successive batches the pH range during the subsequently described bleaching treatments should be held constant.

The washed pulp is now ready for a hypochlorite treatment, the purpose of which is twofold: first, to eliminate residual coloring bodies or impurities which may have survived the chlorination and causticizing treatments, and second, to adjust the viscosity to the level which we have found is required at this stage in the purification in order to yield the desired viscosity in the end product. For example, if a viscosity of 30 ctps. of the final purified product is desired, the pulp viscosity in the calcium hypochlorite treatment will be reduced to approximately 50 ctps., whereas if an end product of 18 ctps. is desired, the viscosity is reduced by means of the bleaching treatment to approximately 30 ctps.

Figure 2 indicates the treating conditions to be selected for reducing the viscosity to any desired point by means of the hypochlorite bleach. For example, the required volume of calcium hypochlorite solution is added to the pulp slurry, which may be at a consistency of 2.5%-10%, to give a solution containing 0.16% bleaching powder, calculated as containing 35% available chlorine. The hypochlorite is added in the form of a solution containing 60-70 grams of bleaching powder per liter and saturated with lime. The viscosity of the pulp is adjusted by regulating the temperature at which the reaction proceeds and maintaining all other conditions constant. The temperature required for reducing the viscosity of the pulp to the desired level for a treatment employing a bleach time of four hours at a consistency of 2.7% and a bleach concentration of 0.16% is shown by reference to the curve of Figure 2. After the completion of the bleach, the pulp is washed with purified water until free of chlorine.

When free of available chlorine, the pulp is dewatered by means of a suitable device such as the commonly used Oliver filter or by employing pressing rolls, a screw press, or a centrifuge, until the consistency is at least 25%. The pulp cake is then added to a solution of caustic soda of such strength that when mixed with the water held by the pulp, the equilibrium concentration will be of the order of 7%. The temperature of the caustic solution to which the pulp cake is added should be at least 50° C. and may vary anywhere in the range of 50° C. to boiling temperature. The consistency at which the alkaline treatment may be carried out may vary between 4% and 12% the proper consistency being entirely dependent upon the type and efficiency of the agitation equipment available. The treatment is allowed to proceed for 1½ to 3 hours at boiling temperature, under conditions which allow a minimum amount of oxygen to come in contact with the pulp. Following this treatment, the pulp is drained free of excess solution and washed with purified water until the pH has been reduced to 7.0–8.0. A typical analysis of the cellulose at this stage of the purification is as follows:

| | |
|---|---|
| Alpha cellulose | per cent__ 94.0 |
| Soda solubles | do____ 4.0 |
| Cupram. viscosity | ctps__ 24.3 |
| Bleachability | per cent__ 1.0 |

An alternate practice to the foregoing is to omit the 1% sodium hydroxide boiling treatment following the chlorination of the raw pulp. In this practice only a sufficient amount of sodium hydroxide is added to the chlorinated pulp to bring the pH of the slurry between 7.0 and 8.0. When this has been accomplished the pulp is thoroughly washed with purified water until the chlorinated compounds have been removed; it is then bleached and treated with a 7% sodium hydroxide solution as previously described.

For attaining the best color in the acetone solutions of the acetate product, pulp intended for conversion to that derivative is given a second light hypochlorite bleach at this point, for example, .5%–1.0% calcium hypochlorite, based on the weight of the pulp present under conditions which have a minimum effect on the viscosity. This step is also useful where the very closest control of the viscosity in the end product is desired, as by selecting the proper temperature, time, concentration, and consistency. The purified pulp at this stage of its purification is susceptible to even more accurate control of the viscosity than in the first hypochlorite bleach.

After the pulp has been washed free of chlorine from the bleach treatment described above, the pulp is again dewatered by any suitable means until the consistency is at least 25%. The pulp cake is then added to a mercerizing caustic soda solution of such a strength that after being diluted by the water held by the pulp, the equilibrium concentration will be in the range of 10%–18%. A satisfactory temperature range to employ is 20° to 25° C., although variations outside these limits are permissible. For instance, if temperatures as high as 40° C. are used in this mercerization treatment, an appreciable lowering of the viscosity as well as an increase in the color of the acetone solution of the acetate prepared from this finished product will be brought about. Temperatures below 20° C. will produce very satisfactory results but there are no advantages over higher temperatures to be derived which would justify the extra expense of the refrigeration thus required. The treatment time may vary between the limits of ½ to 4 hours, more or less, without appreciable variation in the quality of the product. The effects produced by the mercerization treatment are governed primarily by the concentration of the caustic soda solution employed rather than by the volume of solution used.

The properties of the cellulose are especially affected by the procedure followed in removing alkali from the cellulose at the completion of the mercerizing treatment. For example, the degree to which the reactivity imparted to the cellulose by the mercerizing treatment can be retained is influenced by the following factors:

1. The first factor is the time required to effect the removal of the caustic soda from the solution after the concentration of the alkali liquor in contact with the cellulose has been reduced to the order of 8% or less. This time should be not more than the order of 30 minutes, and is preferably 15 minutes or less. While the concentration is in excess of 8%, the time may vary over a wide range, i. e., ½ to 4 hours, with no adverse effects other than a slight progressive reduction of the cuprammonium viscosity.

2. Other factors are the time and amount of exposure to the air of pulp wet with alkali solution after the concentration of the solution has been reduced to the order of 8% or less. This exposure is of course influenced by the nature of the agitation during the caustic removal cycle. It should be kept as low as possible.

Therefore the equipment used for washing the alkali solution from the cellulose should be designed to effect the removal in the shortest possible time, and with a minimum exposure of the cellulose to air. Vigorous agitation of course will accentuate the adverse effect of a given time of exposure upon the above listed properties of the cellulose.

The mercerizing treatment completes the purification of the cellulose which then has the following analysis, for example:

| | | |
|---|---|---|
| Alpha cellulose | per cent | 98.5 |
| Soda solubles | do | 2.5 |
| Ether extracts | do | .20 |
| Uronic acid anhydride | do | .45 |
| Ash | do | .10 |
| Bleachability | do | .25 |
| Cupr. viscosity | ctps | 22.0 |

The derivative to be made and the use for which it is intended frequently require purified celluloses of different but controlled cuprammonium viscosities above 15 ctps. By the present process the cellulose viscosity is controlled in the chlorination and subsequent causticization of the pulp and closely adjusted, in the calcium hypochlorite bleaching treatment, to the value desired in the purified cellulose end product.

The chlorination and subsequent causticization of the pulp are controlled to promote a maximum of purification with a minimum reduction of viscosity. The calcium hypochlorite bleaching treatment conditions can then be controlled so that the desired viscosity above 15 ctps. can be readily obtained. For instance, by reference to Figure 2 it will be seen that the concentration, time, and pH of bleaching can be held constant and the temperature varied to give the desired viscosity, i. e., the higher the temperature, the lower the viscosity. The subsequent processing of the pulp is effected under conditions that have but very little effect on the viscosity, for example, a pulp with a viscosity of 18 ctps. at the termination of the controlled bleaching treatment will have a viscosity of about 17.5 ctps. in the end product. The subsequent treatments are in fact designed to effect their specific function without effecting a change in the viscosity of the cellulose exceeding 5% of its value at the completion of the bleaching treatment.

The washing and dewatering operations during the course of the purification process are carried out on fine mesh, corrosion-resistant material such as Allegheny metal apparatus. For example, Oliver continuous filters may be used. Such filters remove a portion of the "fines" or material consisting of cell wall debris, parenchyma cells, fragments of fibers and vessels, and absorbed material from the cellulose fibers during washing and dewatering.

The pulp may also be classified to more completely remove such "fines" the presence of which is disadvantageous both to the chemical purity and physical properties of the cellulose, and at the same time to further reduce the ash content. Classification may be carried out at any convenient and economical stage in the purification procedure. A satisfactory apparatus for classifying, for example, is a rubber-lined tank equipped with Allegheny metal agitation equipment and an 80-mesh Allegheny screen cover. A 1%—2% slurry of pulp in purified water is fed continuously into the tank, the level being maintained at such a height that the agitation throws the slurry against the screen cover, and by imparting thereto a pulsating action discharges the "fines" through the screen.

The yield of purified cellulose attained is of the order of 34 to 38 or more per cent of the original dry weight of the wood.

The treatments described are preferably carried out under precise conditions of control with respect to (a) concentration of the solutions, (b) quality of the reagents, including water, (c) consistency of the pulp slurry, (d) pH of the treating liquors and wash water, (e) time and temperature of treatments, (f) cleanliness of air throughout the buildings and equipment, (g) minimum or absence of exposure of the pulp to air, especially under alkaline conditions and/or higher than room temperature, and (h) maintenance of pulp moisture above approximately 50%.

The table illustrates the typical chemical analysis of spruce pulp at progressive stages of purification when subjected to the foregoing treatments:

Table

| | Alpha | Soda sol. | Viscosity | Bleachability |
|---|---|---|---|---|
| | Percent | Percent | Centipoises | Percent |
| Unbleached pulp | 86.8 | 23.6 | 55.0 | 32.3 |
| Chlor. and causticized | 93.6 | 8.1 | 72.0 | 1.5 |
| Bleached | 95.1 | 8.3 | 42.0 | 0.37 |
| Causticized | 96.1 | 2.8 | 30.0 | 0.33 |
| Bleached | 96.1 | 2.8 | 28.4 | 0.23 |
| Mercerized | 98.9 | 2.4 | 28.0 | 0.23 |

The purified cellulose produced by the above described process may be dried and acetylated by the conventional, current industrial methods as applied to purified cotton linters, or by other prior art methods, without substantial changes in either procedure, apparatus or technique, to produce cellulose acetate of qualities satisfactory for many purposes, and even superior in some respects to acetate thus derived from cotton linters.

In the process of the present invention, the amorphous impurities are carefully removed from the wood fiber cell walls by treatments sufficiently mild and especially designed to avoid the formation of mucilaginous material and of materials such as those described by the somewhat indeterminate term "cellulose hydrates". As a consequence, a skeleton structure of such fibers results in which the integrity of the original fiber structure has been maintained but with the lignin, pentosans, and other amorphous material occurring around and between the windings of the cellulose fibrils or laminae nearly completely removed. Thus, when wood cellulose of the present invention has been brought to such a state of purity it is apparent that the resulting product must have a highly porous structure, since the original matrix of impurities has become transformed to a network of channels which are available for the distribution and retention of treating agents. This porous structure is in contrast with the relatively compact and solid structure of the purified cotton linter hair and constitutes a fundamental difference between purified cotton linters and purified wood cellulose fibers, and a difference which is of great practical significance to the acetylation and other esterification processes.

To illustrate the significance of this structural difference we have observed in the acetylation of a cotton fiber that the fiber is severed at irregular intervals in the early stages of the reaction. This seems to indicate that the acetylation reagents were able to penetrate the cotton fiber only at a few spots, owing to the very limited porosity of the structure of the outer wall. After penetration of the reagents at these spots, acetylation appeared to be accomplished in these localities and the acetylated portions dissolved in the acid solvent with the consequent parting of the unacetylated portions of the fiber. Further penetration of the fiber segments was then effected through the ends thus formed with subsequent completion of the reaction and solution of the acetate. Thus the acetylation of a cotton fiber is a stepwise process requiring an appreciable interval of time for completion.

In the case of wood cellulose fibers purified according to the process herein disclosed, it has been observed that the fiber swells throughout its length immediately when placed in contact with the acetylation reagents. This is followed by a rapid and uniform reaction, as indicated by the observed fact that dissolution takes place over the entire surface of the acetylated fiber and proceeds uniformly until the entire fiber has been dissolved.

In the process of the present invention, by far the greater portion of residual ligneous material and the like is rendered soluble in the step of treatment with dilute chlorine water under carefully controlled conditions. The chlorinated products are washed from the pulp in the succeeding alkaline treatment. The amount of ligneous material present in the pulp after this treatment is usually 0.1% or less. The remaining traces are removed by means of the calcium hypochlorite bleaches.

The present process gradually and progressively reduces the soda soluble content of the wood pulp by very lenient methods to a value as low as or lower than that of the best commercial grades of purified cotton linters, with a corresponding alpha cellulose content above about 98.5% and frequently as high as 99.5% and even 100%, while maintaining the original structure of the fiber in a honey-combed and highly porous condition. Thus our wood cellulose is a readily permeable, homogeneous product, judged in terms of its alpha cellulose and soda soluble content, which renders it ideal for esterification purposes, especially for acetylation, where lack of homogeneity is invariably reflected in high color and haze and/or unacetylated particles in solutions of suitable commercial solvents.

It must be understood, however, that the attainment of a low soda soluble content with correspondingly high alpha combined with a porous skeleton structure will not alone insure a completely reactive or acetylatable quality of wood cellulose. This is especially the case where the product is dried by the usual vacuum or evaporative practices prior to treatment for conversion into acetate or other derivatives. There are certain non-cellulosic bodies or impurities not identified by the usual chemical analyses which are present in relatively small quantities even in the most highly purified types of commercial celluloses, which exert a profound influence on the characteristics of the esters, ethers and other derivatives. They consist of coagulated protoplasm, cell wall debris, small particles of resins which are frequently found entrapped in mucilaginous material, and amorphous pieces of isotropic cell wall membranes within which particles of cellulose are frequently embedded and thus rendered completely inaccessible to the esterifying reagents.

Other impurities existing in a greater or less degree in wood and other sources of cellulose are the pectic materials. These are the mucilaginous or cementitious substances either comprising or associated with the membranes which apparently envelop the cellulose particles and bind them to each other to form fibrils, and in turn cement the fibrils to each other to form the successive sheaths or laminae of cellulose of which the cell walls of the fiber are built. They are also present in the skin or cementitious membranes between the sheaths, which encase and hold them together. The pectic materials are distinguished by the property of being very difficultly soluble in the usual treating solutions under conditions commonly employed, with consequence that they survive the ordinary digestion and purification systems to an astonishing degree. They also appear to possess varying degrees of resistance to treatment, depending on their location in the fiber structure.

Our present interpretation of the observed results of the present invention is that the combined effect of the mild pulping and purification treatments is to remove the ligneous and other noncellulosic materials, including pectin and amorphous membranes, which exist in a honeycombed disposition in and surrounding the fibers, with the result that the individual fibers have become transformed to a skeleton structure comprising a network of capillary channels admirably suited for an intimate distribution and retention of treating agents to and in every portion of each fiber. In addition, we believe that the strong sodium hydroxide solutions of the mercerizing step or steps effect a swelling of the entire skeleton fiber structure (including the cellulose crystallites) which further enhances the accessibility, permeability, and absorptivity, and consequently the reactivity of the cellulose fibers. Caustic soda has a strong swelling effect on cellulose and as this treatment is applied after most of the impurities have been substantially removed, it is probable that under these conditions an optimum opening-up of the net work of channels and interstices of all of the fibers results, including the spaces between the long chain molecules comprising the cellulose crystallites. As a result of the mercerizing treatment and after the pulp has been washed to neutrality these enlaregd interstices are to a great extent filled with water.

The viscosity of the cellulose solutions has long been considered as associated with the state of complexity of the cellulose molecules. By control of viscosity is usually meant the regulation of the digestion and/or purification of the cellulose in such a way that the original lengths of the cellulose chains are maintained or reduced to any desired extent.

However, a more adequate consideration of the significance of viscosity control seems to require two conceptions:

1. The change in viscosity obtained by separating the long chain cellulose molecules in the bundles from each other by destroying the secondary valence forces holding them together. This action will be designated as "splitting".

2. The reduction in viscosity obtained by depolymerization, which involves breaking the primary valence bonds and thereby reducing the chain lengths of the individual cellulose molecules. This action will be designated as "scission".

In preparing celluloses for esterification where for various technological reasons it is desired to stay within a certain viscosity range, and especially where the highest ranges of viscosity are required with reactive cellulose, it is desirable to employ controls in purification which result in a "splitting" of the secondary valences rather than a "scission" of the primary valence bonds.

Nevertheless, it must be understood that the cuprammonium viscosity is not necessarily an infallible indication of degree of uniformity of the polymerization of the cellulose molecules in the pulps: for example, a viscosity of 30 ctps. may, depending upon the character of the pulping and purification treatments, be merely a statistical average of widely varying viscosities of components composing a given sample, whereas, to be a direct indication of the uniformity of the polymers, the viscosity must be a measure of an average whose components vary but relatively small amounts from that average. The product of the present invention falls within the latter class.

The range within which the cuprammonium viscosity of the cellulose is controlled will vary to some extent with the wood species, and will also depend on the drasticity of the drying to which the purified cellulose is subjected. Higher viscosities will be required where the drying conditions are more drastic, since the subsequent acetylation pretreatment may be expected to be correspondingly more severe in order to restore the reactivity sufficiently to permit a smooth and uniform acetylation.

The pulping of the wood and its purification in the present invention are conducted under especially lenient conditions designed to effect a separation of the bundles of long chain molecules by "splitting", i. e., destroying the secondary valence forces, but largely avoiding the depolymerization of the cellulose through "scission" or the breaking of the primary valence bonds. The effect of these uniform, mild treatments of the wood in the digester, and subsequent purification steps, is to attain an end product distinguished from all wood celluloses of the prior art practices, among other things, by its homogeneity and high retention of native cellulose. The reduction in viscosity of the cellulose by breaking the secondary valence forces as distinguished from undesirable chemical degradation, as by "scission", in combination with high and controlled purity and an absorptive porous fiber structure, results in a product possessing a reactivity which has heretofore never been possible of attainment.

As a further advantage, especially notable from the economical standpoint, more than the order of 80% of the original alpha cellulose present in the wood is retained in the pulp in the present invention, and due to the uniform, lenient treatments throughout the processing this original or native cellulose has undergone much less modification and is characterized by a homogeneity not found in the wood celluloses of the prior art.

To summarize, some of the new and superior properties of the cellulose and of cellulose acetate of the present invention are as follows:

The wood cellulose product may be dried and converted by the method, apparatus and technique in common use in the art into derivatives such as cellulose acetate possessing qualities equal or superior to those obtained by the use of the best grades of cotton linters through a simultaneous attainment in the new product of 1. A soda soluble content of less than the order of 3%, and usually less than 2%, with corresponding alpha cellulose values in excess of the order of 98.5% (or even more than 99.5%), combined with other measures of purity such as ash, ether extractable material, and pentosans equal or superior to those found in acetylatable grades of commercially available cotton linters.

2. A highly porous, absorptive, permeable skeleton structure of the individual fibers comprising the cellulose, and 3. Nearly complete freedom from gelatinous material, pectin, membraneous substances or other impurities which, upon drying, tend to form impermeable, difficultly reversible gels that obstruct or seal the network of channels and capillaries in the skeleton structure, thereby reducing the permeability, and reactivity of the dry cellulose to subsequent treating reagents.

In contrast to the cellulose product of this invention, commercially available wood celluloses without exception are deficient in the requisite purity. They also lack that highly porous, permeable fiber structure essential to the degree of reactivity which permits successful conversion to acetates and other derivatives. Also, they contain quantities of impurities which, upon drying, form non-porous irreversible gels which reduce the permeability and reactivity of the cellulose to treating reagents to the extent that such drasticity of pretreatment is demanded after they are dried by vacuum or evaporative methods that the celulose is thereby rendered unsuitable for conversion into acetates or other derivatives.

In view of the above, it will be seen that the several objects of the invention are achieved and other advantageous results attained.

As many changes could be made in carrying out the above compositions and processes without departing from the scope of the invention, it is intended that all matter contained in the above description or shown in the accompanying drawing shall be interpreted as illustrative and not in a limiting sense.

We claim:

1. The process of producing wood cellulose which comprises treating wood in a suitable state of subdivision with an acid delignifying solution in such manner as to yield a digested pulp having a viscosity of not less than the order of 35 centipoises, as herein defined, and a bleachability of not less than the order of 15%, chlorinating the digested pulp in such a manner as to reduce the bleachability to not more than the order of 2%, treating the chlorinated pulp with a hypochlorite solution in such manner as to reduce the bleachability of the pulp to less than the order of 1%, without substantially reducing the viscosity of the pulp, treating the pulp with a caustic to reduce the soda soluble content of the pulp to the order of 3% or less, treating the causticized pulp with a hypochlorite solution in order to control its viscosity, and mercerizing the pulp to raise its content of alpha cellulose to not less than the order of 98.5% without substantially affecting the viscosity of the pulp, and then drying the cellulose product to a liquid content of not greater than the order of 5%, all of said treatments being carried out in such manner as to avoid any substantial degradation of the cellulose content of the original wood.

2. The process of producing wood cellulose which comprises treating wood in a suitable state of subdivision with an acid delignifying solution in such manner as to yield a digested pulp having a viscosity of not less than the order of 35 centipoises, as herein defined, and a bleachability of not less than the order of 15%, chlorinating the digested pulp in such a manner as to reduce the bleachability to not more than the order of 2%, treating the chlorinated pulp with a hypochlorite solution in such manner as to reduce the beachability of the pulp to less than the order of 1%, without substantially reducing the viscosity of the pulp, treating the pulp with a caustic soda solution to reduce the soda soluble content of the bleached pulp to the order of 3% or less, treating the causticized pulp with a hypochlorite solution in order to control its viscosity, and mercerizing the pulp to raise its content of alpha cellulose to not less than the order of 98.5% without substantially affecting the viscosity of the pulp, and then drying the cellulose product to a moisture content of not greater than the order of 5%, all of said treatments being carried out in such manner as to avoid substantial clogging of the capillary channels and spaces progressively opened by the various treating steps.

3. The process of producing wood cellulose which comprises treating wood in a suitable state of subdivision with a delignifying solution in such manner as to yield a digested pulp, chlorinating the digested pulp in such a manner as to reduce the bleachability thereof, treating the chlorinated pulp with a hypochlorite solution in such manner as to further reduce the bleachability thereof without substantially reducing the viscosity thereof, treating the pulp with a caustic to reduce the soda soluble content of the bleached pulp, treating the causticized pulp with a hypochlorite solution in order to reduce its viscosity, and mercerizing the pulp to raise its content of alpha cellulose without substantially affecting the viscosity of the pulp, and then drying the cellulose product, all of said treatments being carried out in such manner as to avoid any substantial degradation of the cellulose content of the original wood or any substantial clogging of the capillary channels and spaces progressively opened by the various treating steps.

4. The process of producing wood cellulose which comprises subjecting wood in a suitable state of subdivision to the following sequence of steps: (1) digestion with an acid sulfite liquor, (2) chlorination with chlorine, (3) causticization, (4) bleaching with a hypochlorite solution, (5) causticization, (6) reduction of viscosity with a hypochlorite solution, and (7) mercerization with a suitable caustic; the said steps being carried out in such a manner that the product at the completion of such steps has approximately the following alpha cellulose content, soda soluble content, viscosity, and bleachability:

| At end of step | Alpha cellulose | Soda solubles | Viscosity | Bleachability |
|---|---|---|---|---|
| | Percent | Percent | Centipoises | Percent |
| (1) | 86.8 | 23.6 | 55.0 | 32.3 |
| (3) | 93.6 | 8.1 | 72.0 | 1.5 |
| (4) | 94.1 | 6.3 | 42.0 | 0.37 |
| (5) | 96.1 | 2.8 | 30.0 | .33 |
| (6) | 96.1 | 2.8 | 28.4 | .23 |
| (7) | 98.9 | 2.4 | 28.0 | .23 |

5. The process of producing a purified wood cellulose having a viscosity above a predetermined minimum comprising providing sulfite pulp having a viscosity above 20 centipoises as herein defined, subjecting said pulp to purification treatments, comprising chlorinating with an amount of chlorine equivalent to 14%–18% of the bleach value of said pulp and continuing said treatment at least until exhaustion of the chlorine, treating said chlorinated pulp in dilute caustic soda solution at elevated temperature until the chlorinated compounds are dissolved, decolorizing and further purifying said pulp by treating in a hypochlorite solution of not more than 3% concentration at a temperature in the range of 20° C. and 35° C. at a pH not less than 8.0 for not more than four hours, boiling in a non-mercerizing caustic soda solution and mercerizing said pulp so that the pulp has a cuprammonium viscosity of not less than 15 centipoises as defined herein, an alpha cellulose content of not less than 98% and a soda solubility of not more than 3% determined by boiling for about three hours in a 7.14% NaOH solution.

6. The process as set forth in claim 5 wherein the cellulose is provided by impregnating wood in chip form with a bisulfite delignifying solution at a low reactive temperature and forming pulp by raising the temperature of said impregnated chips in said solution to at least the reactive temperature of said digesting reagent, said pulp having a viscosity above 20 centipoises as herein defined.

7. The process as set forth in claim 5 wherein the bleached pulp is treated with an alkaline reagent of a concentration between 5%-9% expressed in terms of sodium hydroxide by boiling the pulp in said reagent at substantially atmospheric pressure until the soda solubility content is reduced to less than 4%, determined by boiling for about three hours in a 7.14% NaOH solution and the alpha cellulose content is increased to not less than 95%.

8. The process as set forth in claim 5 wherein the mercerized pulp is washed until neutral in not more than thirty minutes and thereafter dried.

9. The process set forth in claim 5 wherein the pulp is given a second hypochlorite bleaching following the caustic boiling and prior to mercerization.

LYLE MELVIN SHELDON.
LIONEL ELMER GOFF.
MILTON L. HERZOG.
FREDRICH OLSEN.